United States Patent
Arduini et al.

(10) Patent No.: US 12,443,259 B2
(45) Date of Patent: Oct. 14, 2025

(54) REMOTE SWITCH SYNCHRONIZATION FOR PULSE POWER AND FAULT MANAGED POWER (FMP) APPLICATIONS

(71) Applicant: Cisco Technology, Inc., San Jose, CA (US)

(72) Inventors: Douglas Paul Arduini, San Ramon, CA (US); Sung Kee Baek, San Ramon, CA (US); Ruqi Li, Fremont, CA (US); Joel Richard Goergen, Soulsbyville, CA (US); Chad M. Jones, Doylestown, OH (US); Jason DeWayne Potterf, Austin, TX (US)

(73) Assignee: CISCO TECHNOLOGY, INC., San Jose, CA (US)

(*) Notice: Subject to any disclaimer, the term of this patent is extended or adjusted under 35 U.S.C. 154(b) by 209 days.

(21) Appl. No.: 17/993,323

(22) Filed: Nov. 23, 2022

(65) Prior Publication Data
US 2024/0168533 A1    May 23, 2024

(51) Int. Cl.
*G06F 1/30* (2006.01)
*G06F 1/32* (2019.01)
(Continued)

(52) U.S. Cl.
CPC .............. *G06F 1/30* (2013.01); *G06F 1/3206* (2013.01); *G06F 1/3296* (2013.01)

(58) Field of Classification Search
CPC ... G06F 1/26; G06F 1/266; G06F 1/30; G06F 1/305; H04L 12/10
See application file for complete search history.

(56) References Cited

U.S. PATENT DOCUMENTS 3,648,043 A * 3/1972 Caron ............... G06G 7/24
                                          327/350
3,759,231 A * 9/1973 Endo ................ F02D 41/10
                                          123/492
(Continued)

FOREIGN PATENT DOCUMENTS

WO    2020227045 A1    11/2020
WO    2022081778 A1    4/2022

OTHER PUBLICATIONS

Curtis, P., et al., "EMI Reduction Technique, Dual Random Spread Spectrum," Texas Instruments, Application Note, SNVA974A, Jun. 2020, Revised Nov. 2022, 8 pages.
(Continued)

*Primary Examiner* — Jaweed A Abbaszadeh
*Assistant Examiner* — Cheri L Harrington
(74) *Attorney, Agent, or Firm* — Edell, Shapiro & Finnan, LLC

(57) ABSTRACT

Techniques are provided to synchronize a remote power switch at a power receiver end of a power cable with a first power switch operation at a power source end of the cable, without any physical or data communication means for synchronization. This process may involve synchronization of a MOSFET-type switch with voltage pulsing at the power source cable end to a MOSFET-type isolation switch at the power receiver cable end to provide (voltage or load) power during the On-time and safety testing for a shock hazard during the Off-time. This method synchronizes switching pulses by sensing and synchronizing on the cable switching voltage transients from the source side. This method also involves blanking the additional switching voltage transients on the cable generated after the synchronized switching begins to maintain proper synchronization. These techniques
(Continued)

may be used for a single-pair pulse power cable or with multi-pair multi-phase pulse power cables.

32 Claims, 10 Drawing Sheets

(51) Int. Cl.
  *G06F 1/3206* (2019.01)
  *G06F 1/3296* (2019.01)

(56) References Cited

U.S. PATENT DOCUMENTS

| | | | | |
|---|---|---|---|---|
| 4,680,633 | A * | 7/1987 | Gerdes | H04N 5/10 |
| | | | | 348/696 |
| 4,698,557 | A * | 10/1987 | Harlos | H04N 9/72 |
| | | | | 348/E9.05 |
| 5,146,332 | A * | 9/1992 | Hara | H04N 5/18 |
| | | | | 348/691 |
| 5,157,727 | A * | 10/1992 | Schloss | G10L 19/02 |
| | | | | 704/E19.01 |
| 5,210,518 | A * | 5/1993 | Graham | H03G 3/345 |
| | | | | 340/12.34 |
| 6,879,644 | B1 * | 4/2005 | Jeffress | H04L 25/061 |
| | | | | 370/359 |
| 7,566,987 | B2 | 7/2009 | Black et al. | |
| 8,068,937 | B2 | 11/2011 | Eaves | |
| 8,638,008 | B2 | 1/2014 | Baldwin et al. | |
| 8,768,528 | B2 | 7/2014 | Millar et al. | |
| 8,781,637 | B2 | 7/2014 | Eaves | |
| 9,184,795 | B2 | 11/2015 | Eaves | |
| 9,419,436 | B2 | 8/2016 | Eaves et al. | |
| 9,853,689 | B2 | 12/2017 | Eaves | |
| 9,893,521 | B2 | 2/2018 | Eaves | |
| 10,263,526 | B2 | 4/2019 | Sandusky et al. | |
| 10,468,879 | B2 | 11/2019 | Eaves | |
| 10,541,543 | B2 | 1/2020 | Eaves | |
| 10,714,930 | B1 | 7/2020 | Weiss et al. | |
| 10,735,105 | B2 | 8/2020 | Goergen et al. | |
| 10,790,997 | B2 | 9/2020 | Jones et al. | |
| 11,061,456 | B2 | 7/2021 | Jones et al. | |
| 11,063,630 | B2 | 7/2021 | Arduini et al. | |
| 2006/0215311 | A1 * | 9/2006 | Kaizu | G11B 5/59605 |
| | | | | 360/78.04 |
| 2007/0011547 | A1 | 1/2007 | Karam | |
| 2010/0045302 | A1 | 2/2010 | Karam | |
| 2013/0103220 | A1 | 4/2013 | Eaves | |
| 2014/0340945 | A1 | 11/2014 | Zhang et al. | |
| 2015/0318790 | A1 * | 11/2015 | Tichy | H02M 3/33576 |
| | | | | 363/21.14 |
| 2015/0372826 | A1 | 12/2015 | Blaut et al. | |
| 2016/0142217 | A1 | 5/2016 | Gardner et al. | |
| 2016/0294500 | A1 | 10/2016 | Chawgo et al. | |
| 2016/0294568 | A1 | 10/2016 | Chawgo et al. | |
| 2017/0229886 | A1 | 8/2017 | Eaves | |
| 2018/0098201 | A1 | 4/2018 | Torello et al. | |
| 2018/0123360 | A1 | 5/2018 | Eaves | |
| 2018/0313886 | A1 | 11/2018 | Mlyniec et al. | |
| 2019/0097457 | A1 | 3/2019 | Hazani | |
| 2019/0280895 | A1 | 9/2019 | Mather et al. | |
| 2020/0235949 | A1 * | 7/2020 | Jones | H04B 3/54 |
| 2020/0295955 | A1 | 9/2020 | O'Brien et al. | |
| 2020/0326764 | A1 | 10/2020 | Goergen et al. | |
| 2020/0389329 | A1 | 12/2020 | Jones et al. | |
| 2021/0135890 | A1 * | 5/2021 | Arduini | G05B 9/02 |
| 2021/0167814 | A1 * | 6/2021 | Arduini | H02J 13/00032 |
| 2021/0266188 | A1 * | 8/2021 | Goergen | G06F 1/26 |
| 2022/0190587 | A1 | 6/2022 | Eaves et al. | |
| 2023/0378938 | A1 * | 11/2023 | Bolouri-Saransar | H04B 3/54 |

OTHER PUBLICATIONS

*Voltserver Inc.*, v. *Cisco Technology, Inc.*, "Decision Denying Institution of Post-Grant Review," United States Patent and Trademark Office, PGR2021-00055, U.S. Pat. No. 10,735,105 B2, Aug. 19, 2021, 25 pages.

*Voltserver Inc.*, v. *Cisco Systems, Inc.*, "Patent Owner's Preliminary Response to Post Grant Review Under 35 U.S.C. § 312 and 37 C.F.R. § 42.107," United States Patent and Trademark Office, PGR2021-00055, U.S. Pat. No. 10,735,105, 2021, Jun. 2, 2021, 51 pages.

"Effects of current on human beings and livestok—Part 1: General aspects," Technical Specification, Basic Safety Publication, IEC/TS 60479-1, Edition 4.0, Jul. 2005, 122 pages.

"Information technology equipment—Safety—Part 1: General requirements," International Standard, IEC 60950-1, Edition 2.2, May 2013, pp. 1-61, 63 pages.

"Information technology equipment—Safety—Part 1: General requirements," International Standard, IEC 60950-1, Edition 2.2, May 2013, pp. 62-122, 61 pages.

"Information technology equipment—Safety—Part 1: General requirements," International Standard, IEC 60950-1, Edition 2.2, May 2013, pp. 123-181, 59 pages.

"Information technology equipment—Safety—Part 1: General requirements," International Standard, IEC 60950-1, Edition 2.2, May 2013, pp. 182-253, 72 pages.

"Information technology equipment—Safety—Part 1: General requirements," International Standard, IEC 60950-1, Edition 2.2, May 2013, pp. 254-319, 66 pages.

"Information technology equipment—Safety—Part 1: General requirements," International Standard, IEC 60950-1, Edition 2.2, May 2013, pp. 320-377, 58 pages.

"Information technology equipment—Safety—Part 1: General requirements," International Standard, IEC 60950-1, Edition 2.2, May 2013, pp. 378-433, 56 pages.

"Information technology equipment—Safety—Part 1: General requirements," International Standard, IEC 60950-1, Edition 2.2, May 2013, pp. 434-490, 57 pages.

"Information technology equipment—Safety—Part 1: General requirements," International Standard, IEC 60950-1, Edition 2.2, May 2013, pp. 491-551, 61 pages.

"Information technology equipment—Safety—Part 1: General requirements," International Standard, IEC 60950-1, Edition 2.2, May 2013, pp. 552-622, 71 pages.

"Information technology equipment—Safety—Part 1: General requirements," International Standard, IEC 60950-1, Edition 2.2, May 2013, pp. 623-644, 24 pages.

"Low-voltage switchgear and controlgear—Part 1: General rules," International Standard, Amendment 2, IEC 60947-1, Edition 5.0, Sep. 2014, pp. 1-63, 65 pages.

"Low-voltage switchgear and controlgear—Part 1: General rules," International Standard, Amendment 2, IEC 60947-1, Edition 5.0, Sep. 2014, pp. 64-102, 41 pages.

Stephen Edelstein, "Updated 2016 Tesla Model S also gets new 75-kWhbattery option," Internet Archive WayBack Machine, Green Car Reports, May 5, 2016, 3 pages.

Stephen S. Eaves, "Network Remote Powering using Packet Energy Transfer," IEEE Xplore, Proceedings of IEEE International Conference on Telecommunications Energy (INTELEC) 2012, 978-1-4673-1000, Sep. 30-Oct. 4, 2012, 4 pages.

"Audio/video, information and communication technology equipment—Part 1: Safety requirements," International Standard, IEC 62368-1, Edition 2.0, Feb. 2014, pp. 1-132, 134 pages.

"Audio/video, information and communication technology equipment—Part 1: Safety requirements," International Standard, IEC 62368-1, Edition 2.0, Feb. 2014, pp. 133-263, 131 pages.

"Audio/video, information and communication technology equipment—Part 1: Safety requirements," International Standard, IEC 62368-1, Edition 2.0, Feb. 2014, pp. 264-387, 124 pages.

"Audio/video, information and communication technology equipment—Part 1: Safety requirements," International Standard, IEC 62368-1, Edition 2.0, Feb. 2014, pp. 388-508, 121 pages.

"Audio/video, information and communication technology equipment—Part 1: Safety requirements," International Standard, IEC 62368-1, Edition 2.0, Feb. 2014, pp. 509-593, 85 pages.

(56) References Cited

OTHER PUBLICATIONS

"Audio/video, information and communication technology equipment—Part 1: Safety requirements," International Standard, IEC 62368-1, Edition 2.0, Feb. 2014, pp. 594-676, 85 pages.
"National Electrical Code," National Fire Protection Association (NFPA) 70, 2017, 881 pages.
*Voltserver Inc.*, v. *Cisco Technology, Inc.*, "Declaration of David A. Durfee, Ph.D.," United States Patent and Trademark Office, PGR2021-00055, U.S. Pat. No. 10,735,105, Feb. 16, 2021, 340 pages.
David A. Durfee Ph.D., "Curriculum Vitae," 4 pages.
Adel S. Sedra, "Microelectronic Circuits," Sedra/Smith, Oxford University Press, Seventh Edition, 2015, 38 pages.
Charles k. Alexander, et al., "Fundamentals of Electric Circuits," McGraw Hill Education, Indian Edition 5e, 2013, 37 pages.
Andrew S. Tanenbaum, "Computer Networks," Prentice Hall PTR, Third Edition, 1996, 12 pages.
William Stallings, "Data and Computer Communications," Macmillan Publishing Company, Fourth Edition, 1994, 14 pages.
B.P. Lathi, et al., "Modern Digital and Analog Communication Systems," Oxford University Press, Fourth Edition, 2009, 15 pages.
*Voltserver Inc.*, v. *Cisco Technology, Inc.*, "Petition for Post Grant Review of U.S. Pat. No. 10,735,105," United States Patent and Trademark Office, PGR2021-00055, U.S. Pat. No. 10,735,105, Feb. 16, 2021, 132 pages.
Stephen H. Hall, et al., "High-Speed Digital System Design: A handbook of Interconnect Theory and Design Practices,", John Wiley & Sons, Inc., 2000, 55 pages.
"Understanding 802.3at, PoE Plus Standard Increases Available Power," Microsemi, Jun. 2011, 7 pages.
"Digital Electricity Gen2 Detailed Installation Manual," Voltserver Digital Electricity, Rev B.1, Nov. 29, 2017, 68 pages.
Berkeley Lab ETA, "Touch-Safe, High Voltage Digital Electricity Transmission using Packet Energy Transfer," Vimeo, https://vimeo.com/172469008, Mar. 8, 2016, 8 pages.
*Voltserver Inc.*, v. *Cisco Technology, Inc.*, "Decision Denying Institution of Post-Grant Review," United States Patent and Trademark Office, PGR2021-00056, U.S. Pat. No. 10,735,105 B2, Aug. 23, 2021, 18 pages.
*Voltserver Inc.*, v. *Cisco Systems, Inc.*, "Patent Owner's Preliminary Response to Post Grant Review Under 35 U.S.C. § 312 and 37 C.F.R. § 42.107," United States Patent and Trademark Office, PGR2021-00056, U.S. Pat. No. 10,735,105, 2021, Jun. 2, 2021, 46 pages.
*Voltserver Inc.*, v. *Cisco Technology, Inc.*, "Declaration of Stephens S. Eaves," United States Patent and Trademark Office, PGR2021-00056, U.S. Pat. No. 10,735,105, Feb. 16, 2021, 7 pages.
"Electrical—Computer Conference Proceedings," Internet Archive WayBack Machine Search for Intelec 2012, Curran Associates, Inc., http://www.proceedings.com/electrical-computer-proceedings.html, 2012, 125 pages.
"Part VII: A Summary of Commonly Used MARC 21 Fields," Marc, Understanding MARC, https://www.loc.gov/marc//umb/um07to10.html, retrieved from Internet Feb. 13, 2021, 17 pages.
LC Catalog-Browse, https://catalog.loc.gov/vwebv/searchBrowse, retrieved from the Internet Feb. 12, 2021, 1 page.
"International Telecommunications Energy Conference: [proceedings] (Marc Tags)," Library Catalog, https://catalog.loc.gov/vwebv/staffView?searchId=3877&recPointer=0&recCount=25&searchType=1&bibId=11348322, retrieved from the Internet Feb. 12, 2021, 3 pages.
*Voltserver Inc.*, v. *Cisco Technology, Inc.*, "Petition for Post Grant Review of U.S. Pat. No. 10,735,105," United States Patent and Trademark Office, PGR2021-00056, U.S. Pat. No. 10,735,105, Feb. 16, 2021, 116 pages.
"International Telecommunications Energy Conference: [proceedings] (Full Record)," Library Catalog, https://catalog.loc.gov/vwebv/holdingsInfo?searchId=3810&recPointer=0&recCount=25&searchType=1&bibId=11348322, retrieved from the Internet Feb. 12, 2021, 4 pages.

\* cited by examiner

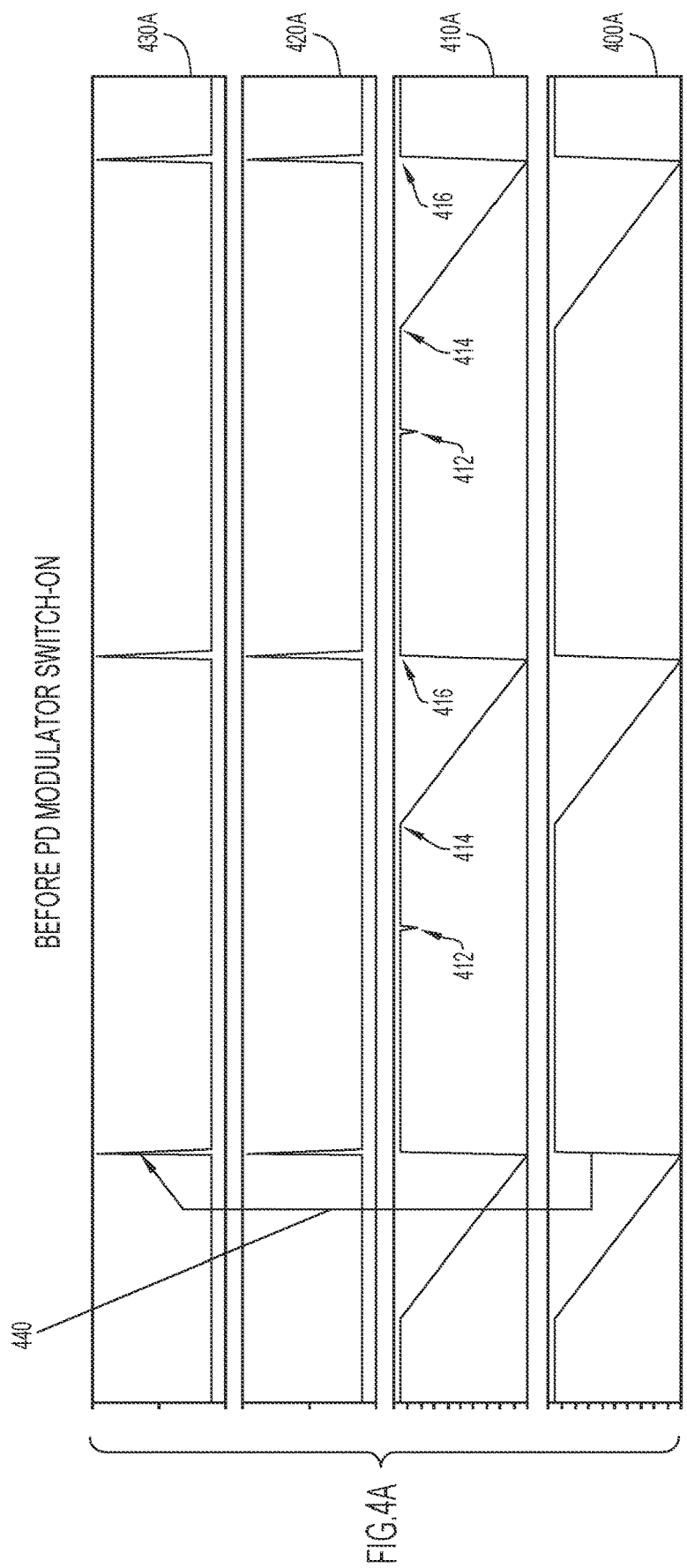

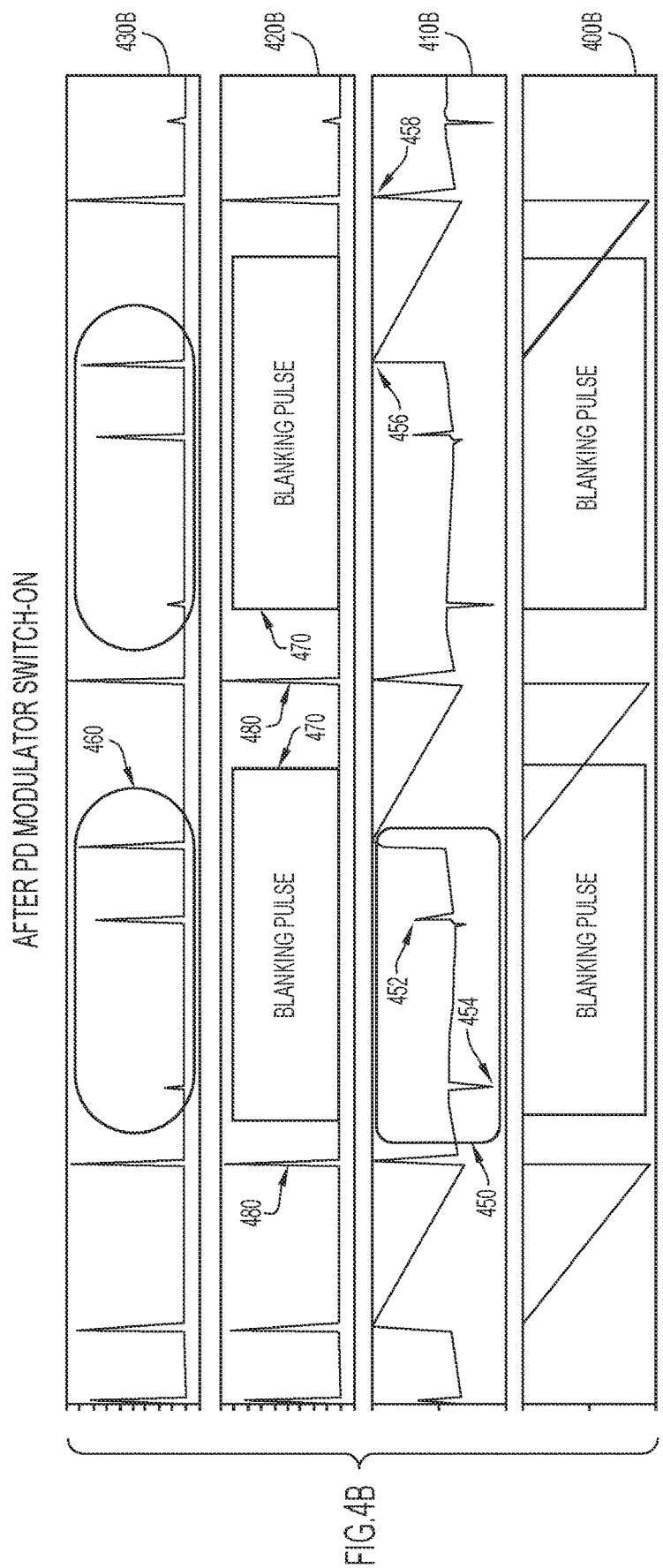

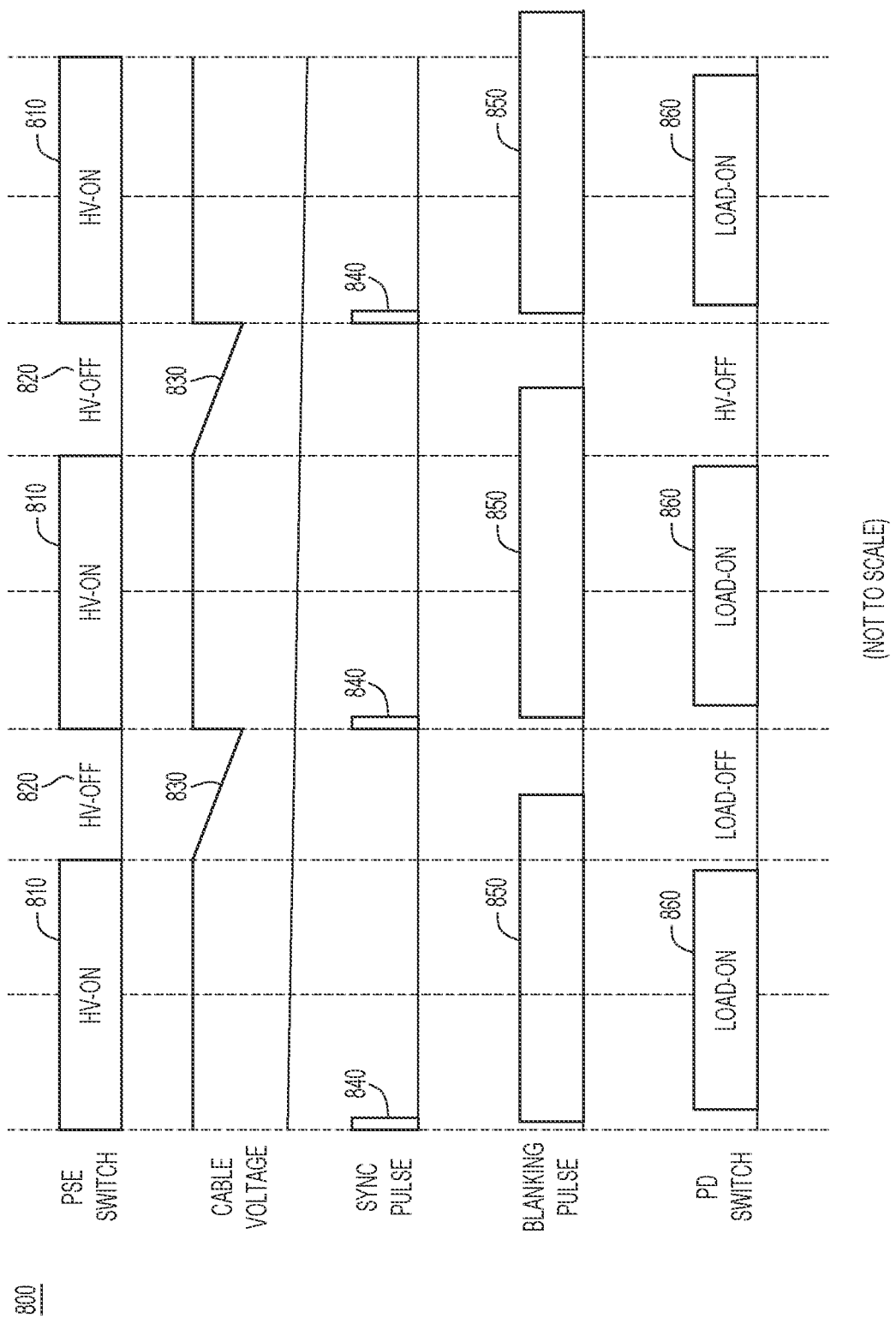

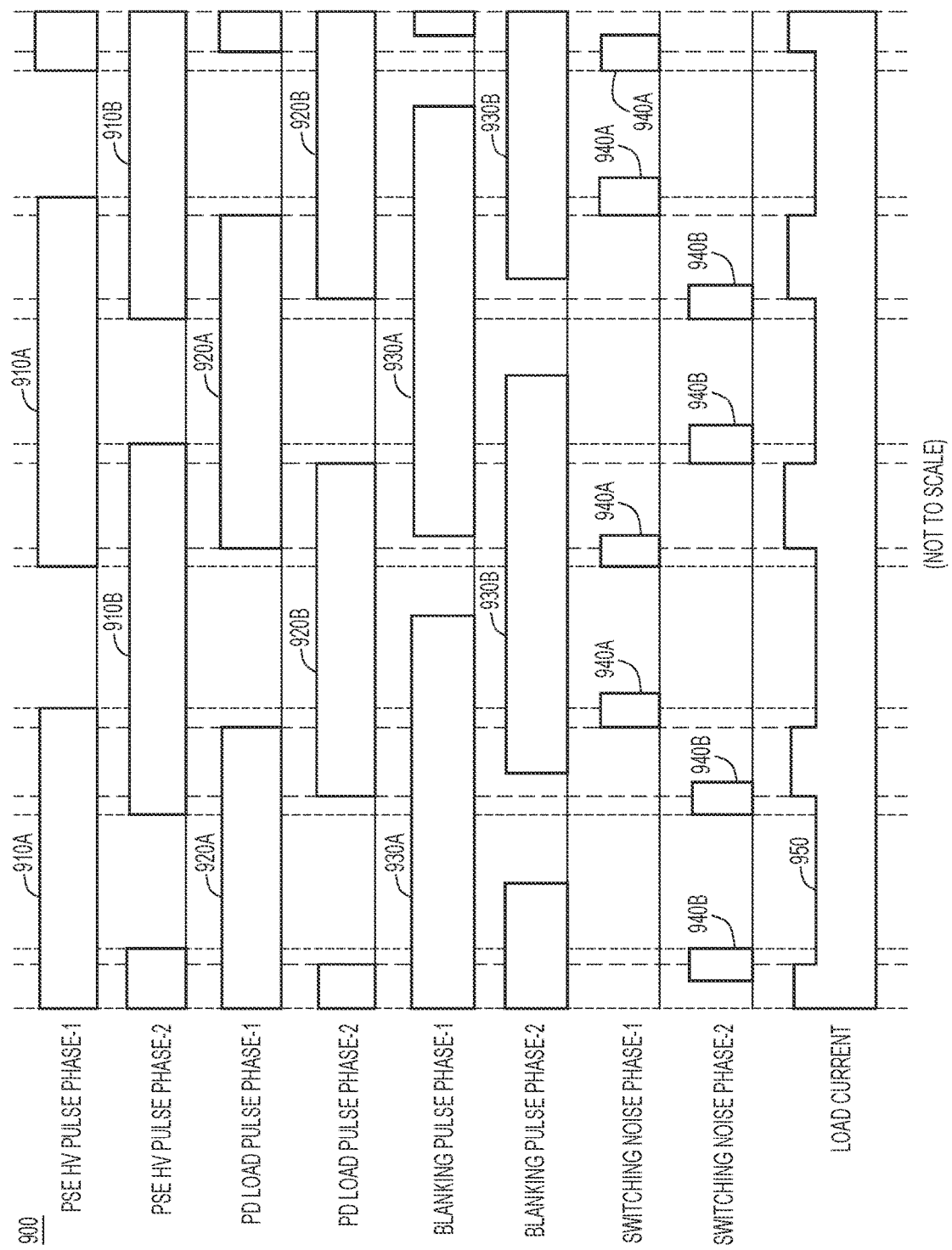

REMOTE SWITCH SYNCHRONIZATION FOR PULSE POWER AND FAULT MANAGED POWER (FMP) APPLICATIONS

TECHNICAL FIELD

The present disclosure relates to a pulsed direct current (DC) source for a remote pulse switching device, such as but not limited to, Fault Managed Power (FMP) systems for safe pulse power on a power cable from the power source equipment (PSE) to a powered device (PD), for electronic devices, such as networking equipment and computing equipment, as well as building technologies, such as heating ventilation and air conditioning (HVAC), lighting systems and appliances.

BACKGROUND

A power fault occurs in an electrical device when an abnormal electrical current occurs, often as a result of a short-circuit. A fault may also occur as a result of human contact with the circuit, or an open-circuit. A fault managed power scheme is a mechanism by which an electrical device manages a situation when a power fault situation occurs.

FMP techniques use safe pulse power on a power cable from power source equipment (PSE) to a powered device (PD). This process may involve synchronization of a switch device, such as a metal oxide field effect transistor (MOSFET)-type switch with power pulsing at the PSE cable end to a MOSFET-type switch at the PD cable end to provide isolation and/or power output during the On-time of the power pulsing and may be part of the safety testing for a shock hazard during the Off-Time of the power pulsing. Synchronization at the PD end is to be achieved in one or two pulses when pulsing starts at a startup phase and when pulsing at the operation phase. There are some applications in which a remote power switch device is to be synchronized with a DC sourced pulse power (e.g., voltage) with no physical or data communication for synchronization. In other words, independent remote control of the remote power device switch (at the PD end) is desired with no synchronization wire connection, no data signal, and no Phase-Lock-Loop (PLL) that would take many cycles to lock.

BRIEF DESCRIPTION OF THE DRAWINGS

FIG. 4A illustrates a set of waveforms associated with operation of the system before the powered device modulator switch is turned on, according to an example embodiment.

FIG. 4B illustrates a set of waveforms associated with operation of the system after the powered device modulator switch is turned on and synchronized, according to an example embodiment

FIG. 8 illustrates a timing diagram of waveforms on a single-phase single-pair cable of a pulse power system with PSE high-voltage bi-directional switching devices for off-time isolation and a PD load bi-directional switching device that uses remote synchronization according to techniques presented herein.

FIG. 9 illustrates a timing diagram of waveforms on 2-phase 2-pair power cables with pulse power from PSE high-voltage bi-directional switching devices for off-time isolation and PD load bi-directional switching devices that use remote synchronization according to techniques presented herein.

DETAILED DESCRIPTION

Overview

Presented herein are techniques to synchronize a remote power switch at a power receiver end of a power cable with a first power switch operation at a power source end of the cable, without any means of communication or data link. This process may involve synchronization of a MOSFET-type switch with voltage pulsing at the power source cable end to a MOSFET-type isolation switch at the power receiver cable end to provide power during the On-time interval and safety testing for a shock hazard during the Off-time interval. This method synchronizes by sensing and synchronizing on the cable switching voltage transients from the source side power switching operation for providing pulse power at both ends of a power cable. This method also involves blanking the additional switching voltage transients on the cable generated after the synchronized switching begins to maintain proper synchronization. These techniques may be used for a single-pair single-phase pulse power cable or with multi-pair multi-phase pulse power cable systems.

Example Embodiments

Techniques are presented herein for fault detection in a system by which a power source device, also called a Power Sourcing Equipment (PSE) in Power of Ethernet (PoE) terminology, supplied power over a cable, such as an Ethernet data cable (or more generally a current loop), to a Powered Device (PD) in PoE terminology. However, while PoE terminology is used herein, it is not meant to be limiting. These techniques may be used to remotely control a switch device at a remote receiving end of an electrical circuit in synchronization with a pulse power switch device at a source end of the electrical circuit.

Figure 1:
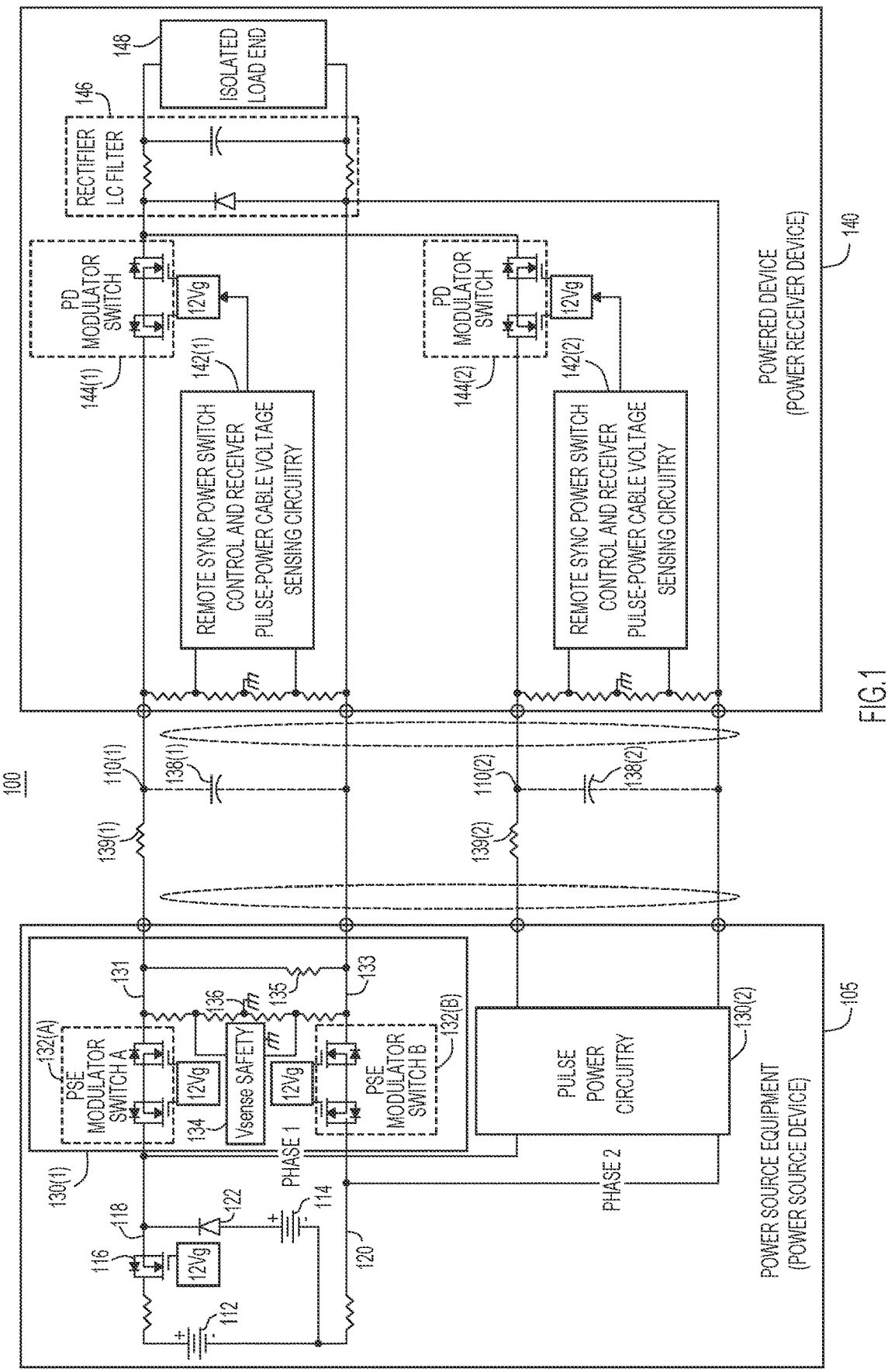
FIG. 1 is a diagram of a pulse power system with remote control synchronization of a remote powered device load switch, according to an example embodiment.

Reference is first made to FIG. 1. FIG. 1 shows a diagram of a system 100 for pulse power remote control synchronization of a PD load switch, for a 2-phase example. The system 100 includes PSE 105 that serves as a power source device for PD 140. The system 100 is representative of a single-phase and a single power cable, as well as multi-phase and multi power cables, as described below. For example, the PSE 105 generates two-phases of pulse voltages (indicated as phase 1 and phase 2 in FIG. 1), and for each phase, there is an associated power cable 110(1) and 110(2) that connects the PSE 105 to the PD 140.

The PSE 105 may be configured for relatively high-voltage (HV) power delivery, in one non-limiting embodiment. In this case, the PSE 105 includes an HV operating voltage source 112 and a low-voltage (LV) start-up voltage source 114. For example, the HV operating voltage source 112 may be 380 volts (V) DC and the LV start-up voltage source 114 may be 15-54 VDC. The PSE 105 further may include an on/off switch 116 coupled between the HV operating voltage source 112 and a send line 118. The HV operating voltage source 112 and the LV start-up voltage source 114 are also connected to a return line 120. A diode 122 couples the LV start-up voltage source to the send line 118.

The PSE 105 further includes, for each phase, pulse power circuitry to supply pulse power (e.g., pulse voltages) to the PD 140. Each phase has a PSE modulator switch on both sides of the line (send and return) for full isolation from the HV operating voltage source 112 during pulse Off-time intervals. For example, the PSE 105 includes pulse power circuitry 130(1) for phase 1 and pulse power circuitry 130(2) for phase 2. Pulse power circuitry 130(1) and pulse power circuitry 130(2) comprise the same components, but are controlled to supply voltages in different phases. Thus, for simplicity, only the components are pulse power circuitry 130(1) are described.

Pulse power circuitry 130(1) includes a first PSE modulator switch 132(A), also denoted PSE modulator switch A, coupled in a cable source end 131 and a second PSE modulator switch 132(B), also denoted PSE modulator switch B, coupled in a cable return end 133. The PSE 105 may include a voltage sensing safety circuit 134 that is coupled to measure the voltage between the cable source end 131 and a mid-point ground 136 and between the cable return end 133 and the mid-point ground 136. The PSE modulator switches 132(A) and 132(B) may include a pair of MOSFET-type back-to-back switches for bidirectional isolation from the source during the Off-time intervals, as shown. Switches 132(A) and 132(B) may be replaced with single-MOSFET-type switches with source voltage isolation during the Off-time intervals. Switches 132(A) and 132(B) with source isolation are useful to isolate both sides of the output voltage line or cable for a PoE-type output or mid-point grounding in pulsed DC circuits, such as fault managed power systems. Switch 132(B) may be omitted if full isolation from the source is not needed and only switch 132(A) is used as a voltage switch to the source, such as a high-side line switch from a grounded source. The PSE voltage pulses are connected to a voltage divider on both sides of the mid-point ground 136 on both ends of the power cable 110(1). The power cable 110(1) has cable capacitance 138(1) and cable resistance 139(1). Pulse power circuitry 130(2) for phase 2 is similar to pulse power circuitry 130(1) for phase-1, but supplies pulse voltage over power cable 110(2), which has a cable capacitance 138(2) and cable resistance 139(2). The safety circuit 134 of the PSE 105 may use droop voltage versus time (−dv/dt slope) sensing during the Off-time switching of the PSE modulator switch 132(A), or auto-negotiation time, to detect a human body resistance across the cable capacitance 138(1) that would cause an unsafe body current at the cable source voltage as a fault condition, then inhibit another On-time pulse of body current exposure. Resistor 135 may switch in a known resistance for the cable voltage droop slope to help calibrate and calculate the unknown body resistance and the unknown cable capacitance for a worst-case cable source voltage. Resistor 135 also provides a default voltage droop during the Off-time switching period (of the PSE modulator switch 132(A)) across the cable capacitance 138(1) to enable the synchronization method to detect a positive-going (+dv/dt) transient at the end of the Off-time when PSE modulator switch 132(A) turns on a voltage pulse during a no-load start-up process of the pulse power system. The value of the maximum cable capacitance 138(1) with the value of resistor 135 may be chosen to be in the first 10% RC-time constant range for a nearly linear voltage versus time dv/dt discharge slope.

At the PD-end of the power cable(s) is a circuit control block that includes a remote synchronization for PD modulator power switch control in the receiver end of the power cable of the DC pulse-power for voltage transient synchronization sensing and controlling the remote PD modulator load switch. More specifically, the PD 140 includes a remote synchronization (sync) power load switch control and receiver pulse-power cable voltage sensing circuitry for each power phase received from the PSE 105. Thus, in the example of FIG. 1, the PD 140 includes remote sync power switch control and receiver pulse-power cable voltage sensing circuitry 142(1) for phase 1 and remote sync power switch control and receiver pulse-power cable voltage sensing circuitry 142(2) for phase 2. In addition, the PD 140 includes a PD modulator switch for each phase, that is, PD modulator switch 144(1) for phase 1 and PD modulator switch 144(2) for phase 2. PD modulator switch 144(1) are MOSFET-type back-to-back switches for bidirectional switching from the voltage input, as shown. PD modulator switch 144(1) may be single-MOSFET-type switch with input voltage switching. With PD modulator switch 144(1) and PSE modulator switches 132(A) and 132(B) in the Off-state, the cable is isolated at both ends with only an isolated load return connection. This allows multiple grounding options, including mid-point grounding shown at both ends of the cable. The remote sync power switch control and receiver pulse-power cable voltage sensing circuitry 142(1) is coupled to, and controls operation of PD modulator switch 144(1). Similarly, the remote sync power switch control and receiver pulse-power cable voltage sensing circuitry 142(2) is coupled to, and controls operation of PD modulator switch 144(2). The output of the PD modulator switch 144(2) pulses are coupled to be added to the output of the PD modulator switch 144(1) pulses, the result of which is filtered by a rectifier LC filter 146, which in turn is coupled to an isolated load end 148.

The path between the cable source end 131 and cable return end 133 may be considered, more generally, an electrical circuit that connects a pulse power switch device at a source end (e.g., the PSE 105) with a switch device (e.g., PD modulator switch 144(1) and/or 144(2) at a remote receiving end (e.g., PD 140).

It is to be understood that there is an instance of the remote sync power switch control and receiver pulse-power cable voltage sensing circuitry for each phase of power in the system 100. Thus, while FIG. 1 shows two power phases (phase 1 and phase 2), there may be a single power phase or more than two power phases, depending on the requirements of a given application.

The remote sync power switch control and receiver pulse-power cable voltage sensing circuitry 142(1) and 142(2) shown in FIG. 1 is configured to enable synchronizing of the PD modulator switch 144(1) and 144(2) at one end of a power cables 110(1) and 110(2) with operation of the PSE modulator switches 132(A) and 132(B) in the pulse power circuitry 130(1) and 130(2) at the other end of the power cables 110(1) and 110(2), without any additional control communication or control data. The operations performed by the remote sync power switch control and receiver pulse-power cable voltage sensing circuitry rapidly synchronizes (e.g., in one or two switching pulses) by sensing and synchronizing on the power cable switching voltage plus-going (positive-going) transient from the first voltage switching operation that provides pulse voltage at both ends of a power cable. The remote sync power switch control and receiver pulse-power cable voltage sensing circuitry also blanks the additional switching voltage transients on the power cable generated after the synchronized switching of the PD modulator switch begins to maintain proper synchronization, including with single-pair pulse power cable or with multi-pair multi-phase pulse power cables. The switching noise is worse at higher load current conditions at isolated load end 148, and at higher values of the resistors 139(1) and 139(2) that may be associated with longer cable lengths. The remote sync power switch control and receiver pulse power cable voltage transient sensing circuitry 142(1) and 142(2) may also use current sensing circuitry derived from the voltage transient waveform.

At the PD 140, the PD modulator switch turns on by looking at the waveform coming from the PSE 105 as it is modulating. The remote sync power switch control and receiver pulse-power cable voltage sensing circuitry 142(1) and 142(2) is configured to pick out a plus-going (positive-going) transient voltage out from any noise on the line that is required to synchronize the turn-on of the PD modulator switch 144(1) and 144(2), respectively. With no-load switching before the PD modulator is switching, there is only one plus-going (positive going) voltage transient from each phase, where the voltage transient needed to synchronize each phase is much larger than the transient caused by the respective other phases, when applicable. Therefore, to synchronize on the proper plus-going transient, a plus-going voltage transient sensing circuit needs to be sensed and triggered above the highest plus-going voltage transients from the respective other phases, when applicable.

Figure 2:
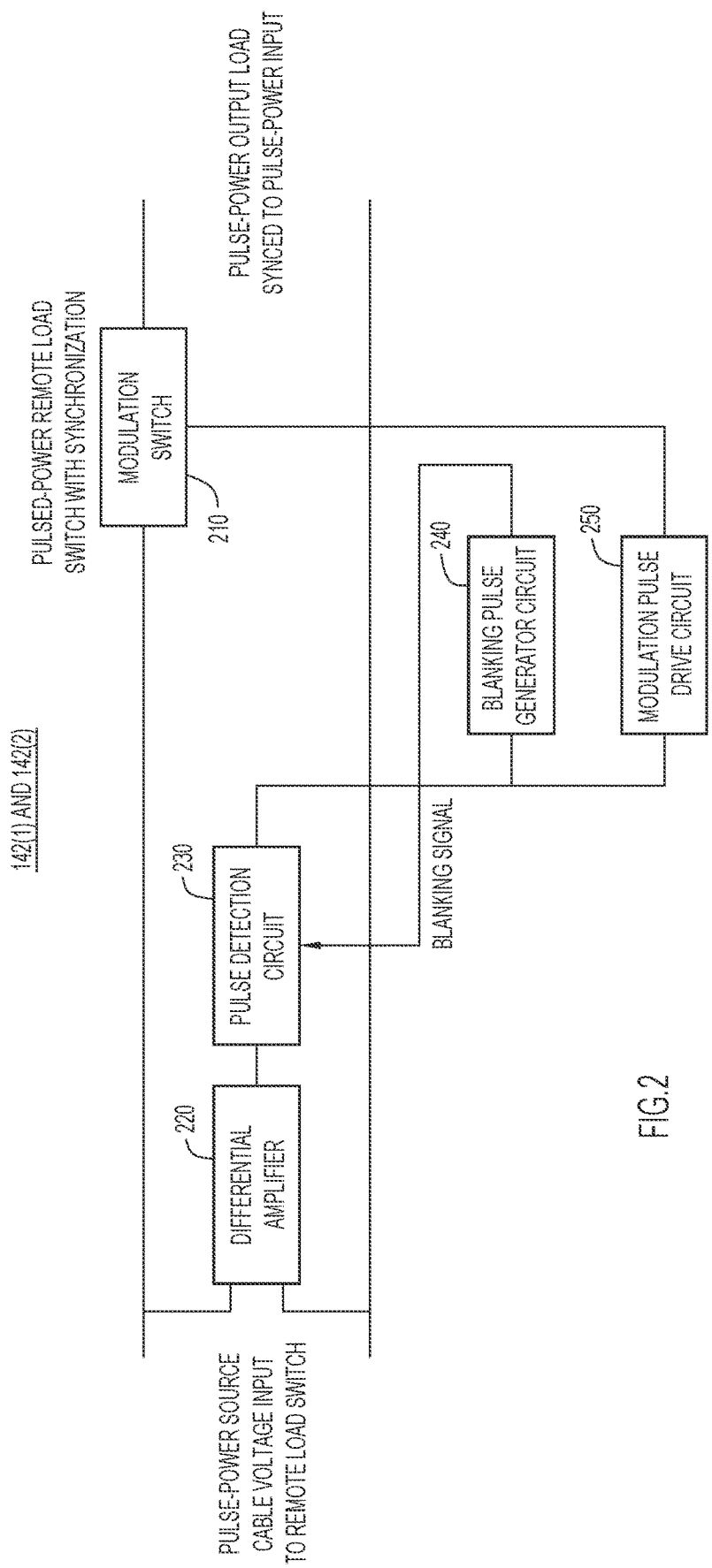
FIG. 2 is a high-level block diagram of a remote synchronization power modulation switch control in the receiver-end of a pulse-power cable with voltage sensing circuitry provided in the remote powered device, according to an example embodiment.

Reference is now made to FIG. 2 for a high-level description of the remote sync power switch control and receiver pulse-power cable voltage sensing circuitry 142(1) and 142(2). The circuitry involves synchronization of a MOSFET-type switch (with HV pulsing) at the PSE source cable end to a MOSFET-type isolation switch at the PD cable end to provide (high) power during the ON-time of the PSE pulsing and safety testing for a shock hazard during the OFF-time of the PSE pulsing. At a high-level, the circuitry includes a modulation switch 210, a differential amplifier 220 (from a mid-point grounded voltage divider not shown), a pulse detection circuit 230, a blanking pulse generator circuit 240 and a modulation pulse drive circuit 250.

The pulse power source cable voltage input is coupled to a remote modulation load switch 210. The differential amplifier 220 senses (desired) voltage waveform plus-going transients and sends them to the pulse detection circuit 230. In one form, as described below in connection with FIG. 3, the pulse detection circuit 230 includes a positive dv/dt differentiator and comparator that produces a synchronization pulse for the modulation pulse drive circuit 250 to control the modulation switch 210. The modulation switch 210 produces a voltage or pulse-power output to the load that is synchronized to input switched pulse voltage or pulse-power from the source end. The blanking pulse generator circuit 240 generates blanking pulses with respect to "true" sync transient pulses in order to blank or mask any spurious noise pulses on the cable, as described below.

Figure 3:
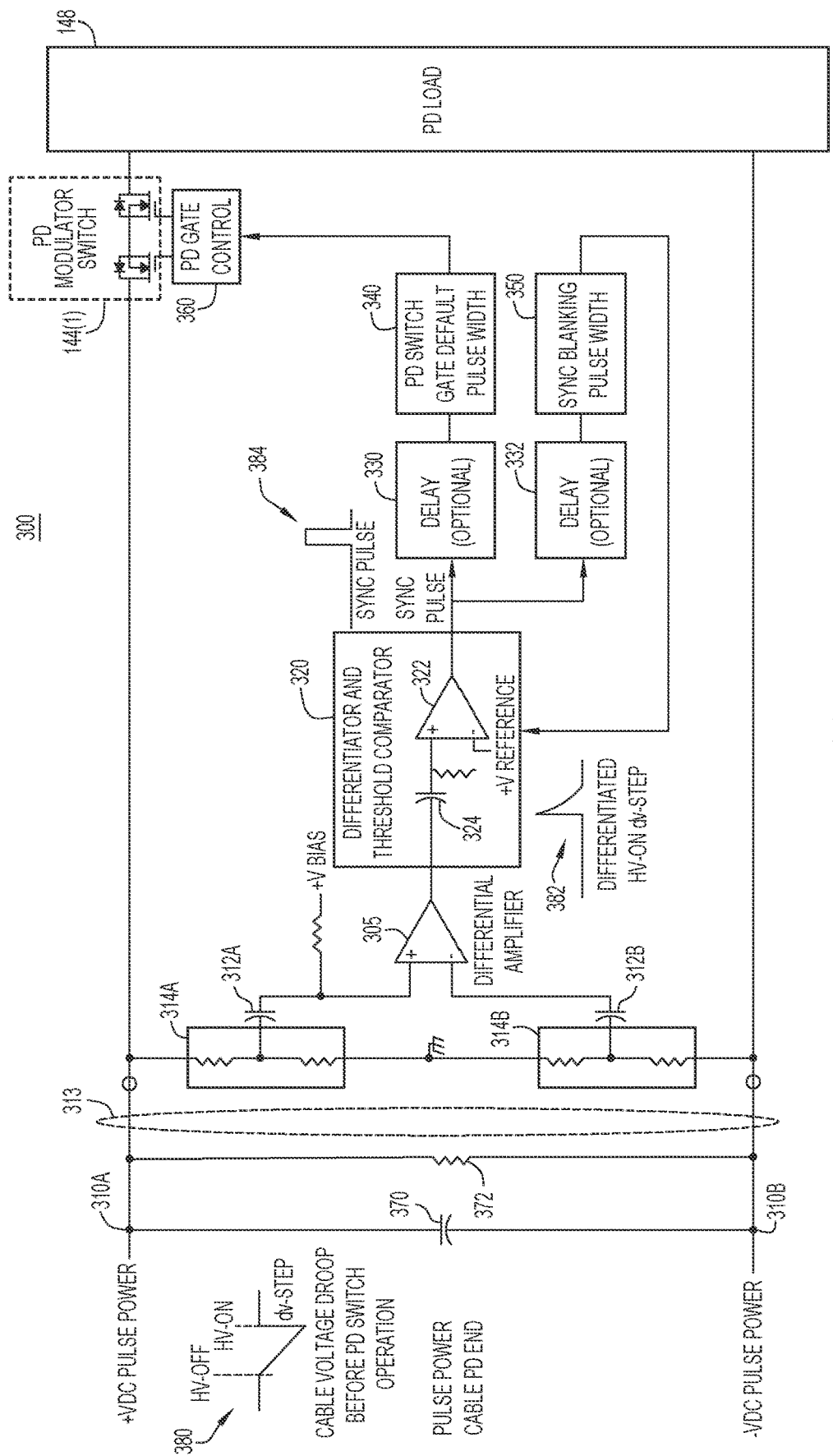
FIG. 3 is a more detailed diagram of a remote synchronization power switch control method in the receiver-end of a pulse-power cable with voltage sensing circuitry, according to an example embodiment.

Reference is now made to FIG. 3. FIG. 3 illustrates a circuit block diagram 300 of the remote sync power switch control in the receiver or load end of the pulse power system with pulse-power cable voltage sensing circuitry, and is representative of remote sync power switch control and receiver pulse-power cable voltage sensing circuitry 142(1) and 142(2), etc. The remote sync power switch control and receiver pulse-power cable voltage sensing circuitry includes an AC coupled differential amplifier 305 that is AC-coupled via capacitors 312A and 312B to +VDC pulse power line 310A and to −VDC pulse power line 310B (of a cable 313) via a respective mid-point grounding voltage divider 314A and 314B, respectively. The differential amplifier 305 may have an adjustable gain in order to apply gain, as needed.

The output of the differential amplifier is coupled to a differentiator and threshold comparator 320. The differentiator and threshold comparator 320 includes an operational amplifier 322 configured to operate as a comparator to compare a voltage, integrated by capacitor 324, to an optional voltage reference (+V reference).

There is an optional delay circuit 330 and an optional delay circuit 332 coupled to the output of the differential amplifier 305 and differentiator and threshold comparator 320. A PD switch gate default pulse width circuit 340 is coupled to the output of the delay circuit 330 (or directly to the output of the differential and threshold comparator 320) and a sync blanking pulse width circuit 350 is coupled to the output of the delay circuit 332 (or directly to the output of the differential and threshold comparator 320). The output of the PD gate default pulse width circuit 340 is coupled to PD gate control circuit 360 that drives the complementary MOSFET switches of the PD modulator switch 144(1) in sync with the PSE modulator switch 132(A) shown in FIG. 1. The output of the sync blanking pulse width circuit 350 is coupled to the differential and threshold comparator 320 to inhibit any unwanted plus-going transients that are may provide incorrect synchronization. The optional delay circuits 330 and 332 are useful in order to allow a longer sync pulse from differential and threshold comparator 320 without blanking/cutting off the sync pulse width time. FIG. 3 shows that there is a capacitance 370 and a resistance 372 associated with the cable 313, the PSE 105 and the PD 140.

When the PD modulator switch 144(1) turns on, initially the remote sync power switch control and receiver pulse-power cable voltage sensing circuitry attempts to synchronize to desired transients in the pulse power waveform. Sometimes it may synchronize to the wrong pulse and then get out of phase synchronization with the PSE modulator switch. When pulse power is applied with the PD modulator switch synchronizing incorrectly, there will be lower current on the cable than when operating correctly, and the safety fault sensing during the PD modulator switch Off-time will be defeated for proper operation. The system then needs to turn off and start over, with the PD reattempting to synchronize to the PSE correctly. This may be less of an issue with single phase power for the most part because there is only one vertical pulse to detect, but if there are multiple phases, the noise from the other phases may be mistaken for desired transients and the PD could erroneously synchronize to that noise.

The circuitry shown in FIG. 3 enables synchronization at the PD end to the PSE pulsing with no load, but once a load is put on the cable and synchronization starts, there will be noise imposed on the cable, and it is desirable not to synchronize to that noise. Again, the circuitry shown in FIG. 3 performs a method of synchronizing a remote PD modulator switch (that has a load) with PSE pulse power and performing blanking of the noise on the cable.

More specifically, when the PD modulator switch 144(1) starts switching On and Off with PD load current and the pulsed power system has two or more phases, there is (new) noise from voltage transients that may interfere with the synchronization pulse transient that is used for proper synchronization of the PD modulator switch 144(1). These noise transients need to be blanked so that the PD modulator switch 144(1) does not synchronize to the noise.

In operation, the DC pulse voltage from the PSE modulator switch output is produced on the cable capacitance 370 with a charge voltage during the PSE pulse On-time and a droop voltage during the PSE pulse Off-time through the resistance 372. Resistor 372 is used to produce a droop voltage and to also produce a plus-going transient at the end of the droop that is sensed in order to generates the sync pulse with no load before the PD modulator switch is operating. The resistor 372 may be part of the PD 140 or in the PSE 105, or part of both. The AC-coupled differential amplifier 305 amplifies signals coupled via capacitors 312A and 312B through the voltage dividers 314A and 314B, and couples the positive transient dv/dt at the end of the HV Off-time through the differentiator and threshold comparator 320. FIG. 3 shows, at waveform 380, the cable voltage droop before PD switch operation. The AC-coupled differential amplifier 305 ignores any signal going negative and amplifies only positive going signals. Thus, the AC-coupled differential amplifier 305 ignores the negative going transition from HV-Off to HV-On, but amplifies the positive going transition associated with dv-step. The output of the differential amplifier 305 is shown at 382, representing differentiated HV-On dv-step derived from the waveform 380. Moreover, the differentiator and threshold comparator 320 looks for fast dv/dt positive-going transient signals. As the PD modulator switch 144(1) is switched ON, the droop shown on waveform 380 ends because the voltage goes back up to the source voltage (e.g., 380 V). When that happens, there is a positive going pulse out of the differentiator and threshold comparator 320. This is the sync pulse 384 shown in FIG. 3. The sync pulse 384 is the start of a preset pulse width, generated by the PD switch gate default pulse width circuit 340, that turns on the PD modulator switch 144(1) switch immediately or after an optional delay time set by the delay circuit 330.

If the PD modulator switch 144(1) is configured to start switching at the wrong time (by synchronizing to noise instead of sync pulses), then the PD modulator switch 144(1) will pulse the isolated load end 148 at the wrong time, possibly during the pulse power "off" time and interfere with proper pulse power system operation. Once loading on the cable begins by pulsing at the PD end, there is additional noise that may occur on the cable, especially if there are multiple phases. The sync blanking pulse width circuit 350 generates blanking pulses supplied to the differentiator and threshold comparator 320 so as to blank that noise in order not to synchronize to those noise pulses. The sync blanking pulse width circuit 350 generates the blanking pulses of duration or pulse width and applies them on the cable (via the differentiator and threshold comparator 320) to wash/blank out the noise on the cable so that the differentiator and threshold comparator 320 detects the larger sync pulses 384 used for synchronization and cause the PD end to ignore any noise during a particular period of time. The blanking pulse is a pulse of a preset duration that blanks out the noise (cable transient noise voltages not to be used for synchronizing or noise from adjacent pulse voltages or pulse power phases) that could be on the cable. The blanking pulse may be delayed by an interval of time based on operation of the optional delay circuit 332.

Reference is now made to FIGS. 4A and 4B, which show timing of waveforms associated with the operation of the system 100. Reference may also be made to FIGS. 1-3 for purposes of the description of FIGS. 4A and 4B. The cable voltage waveforms are shown on both ends of the cable, the PSE modulator switch end and the PD modulator switch end. The cable waveforms are also shown before and after the PD modulator switch is operating (switching On-Off) with load current. FIG. 4A shows a set of waveforms 400A, 410A, 420A and 430A associated with operation of the system 100 before the PD modulator switch 144(1) is turned on, FIG. 4B illustrates a set of waveforms 400B, 410B, 420B and 430B after the PD modulator switch 144(1) is turned on. These waveforms are for a 2-phase example, as depicted in the configuration shown in FIG. 1.

Referring to FIG. 4A before the PD modulator switch is operating and therefore there is no current loading, waveform 400A is the cable source-end with pulse voltage input corresponding to the waveform generated by operation of the PSE modulation switches 132(A) and 132(B) at the PSE 105. Waveform 410A is the cable load-end with pulse voltage output provided at the cable PD end, which corresponds to waveform 380 shown in FIG. 3. Waveform 410A is similar to waveform 400A, except that waveform 410A is susceptible to noise on the cable coming from various sources including other cable pair phases of pulse voltages, and this is shown by small noise artifacts in waveform 410A that are not present in waveform 400A. In waveform 410A, noise associated with switching in another phase, e.g., phase 2, is shown at 412. In addition, at 414, the PSE HV-Off starts with a −dv-step droop voltage, and similarly at 416, PSE HV-On starts with +dv-step at the end of the droop voltage creating a plus-voltage transient.

Waveform 420A is the sync pulse waveform generated at the output of the differentiator and threshold comparator 320, which corresponds to waveform 384 in FIG. 3, but when blanking pulses are imposed. Since waveform 420A is associated with operation when the PD modulator switch 144(1) is not on, then there are no blanking pulses imposed. Waveform 430A is the sync pulse waveform generated at the output of the differentiator and threshold comparator 320 without synchronization and without blanking pulses applied. Again, since waveforms 420A and 430A are associated with operation when the PD modulator switch 144(1) is not on, then waveforms 420A and 430A are identical. Worthy of note in FIG. 4A is that the sync pulse waveform 430A is triggered by the rise cable voltage input waveform 400A, as shown at 440

After the PD modulator switch 144(1) is turned on, the waveforms 400B, 410B, 420B and 430B are representative of what may be observed, as shown in FIG. 4B. Waveform 400B is the cable voltage input and the blanking pulses are overlaid on this waveform to illustrate the effect of the blanking pulses. Waveform 410B is the cable voltage output, and now that the PD modulation switch 144(1) is on, it can be seen that the waveform 410B has several spurious pulses caused by modulation noise or multiple phases, as shown at reference numeral 450. More specifically, the pulses 452 and 454 are associated with phase-2 switching noise. In addition, reference numeral 456 shows when the PD modulator switch and load are turned-off with a plus-going +dv-step caused by the load current turn-Off times the cable resistance 139(1)

(creating an IR-drop voltage step), and reference numeral 458 shows when PSE HV-On, with +dv-step. This voltage associated with reference numeral 465 level is proportional to the cable resistance 139(1) and load current, whereas the voltage associated with reference numeral 458 level is proportional to the cable voltage droop from the capacitor cable capacitance 138(1) across resistor 139(1) (shown in FIG. 1), and in parallel with resistor 372 (shown in FIG. 3) when applicable. Thus, as depicted by waveform 410B, the cable voltage waveform on the PD end is complex after load switch modulation starts. After PD modulator switching, the PD end transient waveform transient voltages from the PD load-Off +dv-step at reference numeral 456, need to be blanked, and the and the PSE HV-On +dv-step, shown at reference numeral 458 need to be undeterred in order to drive proper sync pulse generation. The pulses in waveform 410B are the desired synchronization transients to be detected to generate synchronization pulses for driving the PD modulator switch.

As explained herein, the solution is to blank a section of the waveform from the circuitry that generates the sync pulses, with an optional delay for the sync pulse width after the plus-voltage-transition at the start of synchronizing before PD switch modulation, and thereafter synchronization should continue correctly. Waveform 430B shows the sync pulse waveform generated at the output of the differentiator and threshold comparator 320 without blanking pulses applied, and in particular at 460, the spurious pulses in this waveform are triggered as a result of the spurious pulses in waveform 410B shown at 450. However, the blanking pulses, shown at 470, mask, hide or blank the spurious pulses shown at 460 in the sync pulse waveform so that all that remains in the sync pulse waveform are the "true" or desired sync pulses 480 that are triggered in synchronization to the cable voltage input depicted by waveform 400B.

Figure 5:
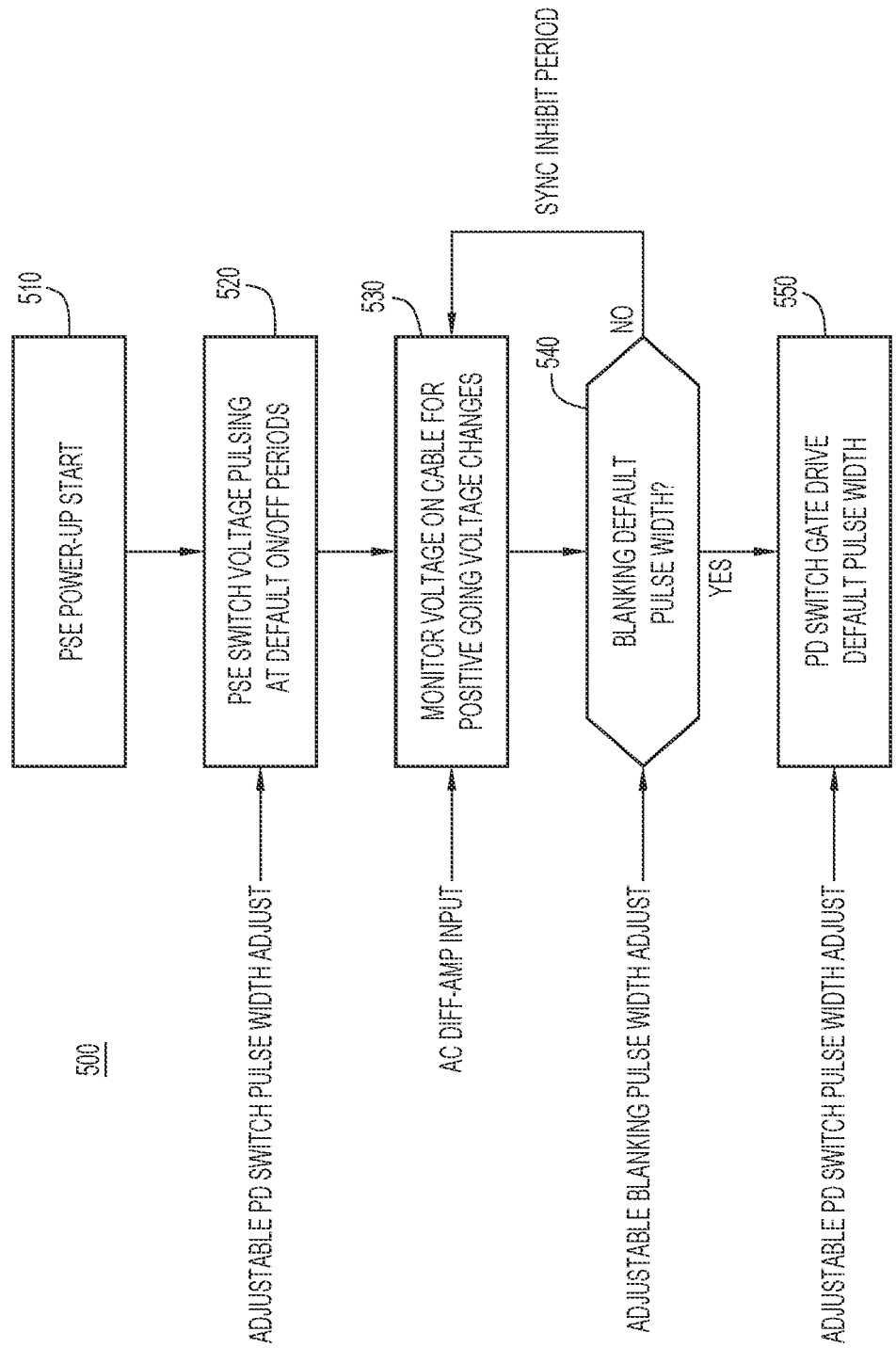
FIG. 5 illustrates a flow chart of a synchronization control method for remote load power switching on an initially unpowered load of a pulsed power cable system, according to an example embodiment.

Reference is now made to FIG. 5, which illustrates a flow chart for a digital control method 500 for remote load power switching on an initially unpowered load of a pulse power cable system example. At 510, at the PSE end, power-up start is performed. Next, at 520, the PSE modulation switch performs voltage pulsing at default On/Off periods/intervals, with possible adjustable PSE switch pulse width thereby delivering pulse power over the power cable to the PD load end.

At the power cable PD load-end, the circuitry powers up and gate voltages are allowed to reach levels suitable for PD modulation switch operation, not shown. At 530, the voltage on the PD-cable end is monitored/sensed for positive going changes in voltage over time (+dv/dt) using an AC-coupled differential amplifier in order to trigger sync pulses. The monitoring at step 530 is subject to inhibit periods when the blanking pulses are generated at 540, and the width of the blanking pulses may be adjusted as indicated in the flow chart. The proper sync pulses are not inhibited by the blank pulses and produce sync pulses used to drive the PD modulator switch in synchronization to the PSE modulator switch with a default or adjustable pulse width, at 550.

Figure 6:
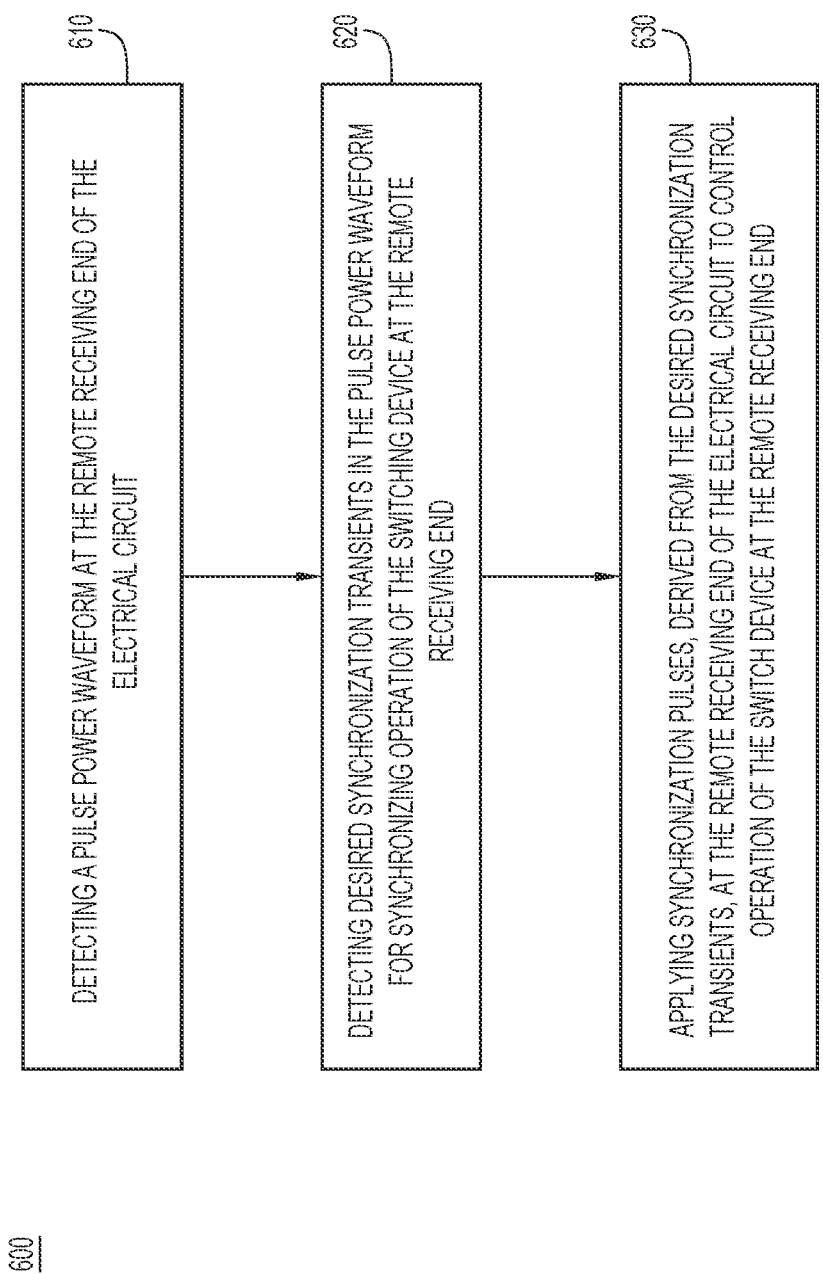
FIG. 6 illustrates a flow chart for a synchronization method performed in a remote powered device according to an example embodiment.

Reference is now made to FIG. 6, which illustrates a flow chart for a method 600 according to an example embodiment. The method 600 is to remotely control a load power switch device at a remote receiving end of an electrical circuit in synchronization with a pulse voltage switch device at a source end of the electrical circuit. At step 610, the method comprises detecting a pulse power waveform at the remote receiving end of the electrical circuit. At step 620, the method involves detecting desired synchronization transients in the pulse power waveform for synchronizing operation of the switch device at the remote receiving end. At step 630, the method involves applying synchronization pulses, derived from the desired synchronization (voltage) transients, at the remote receiving end of the electrical circuit to control the operation of the switch device at the remote receiving end.

Figure 7:
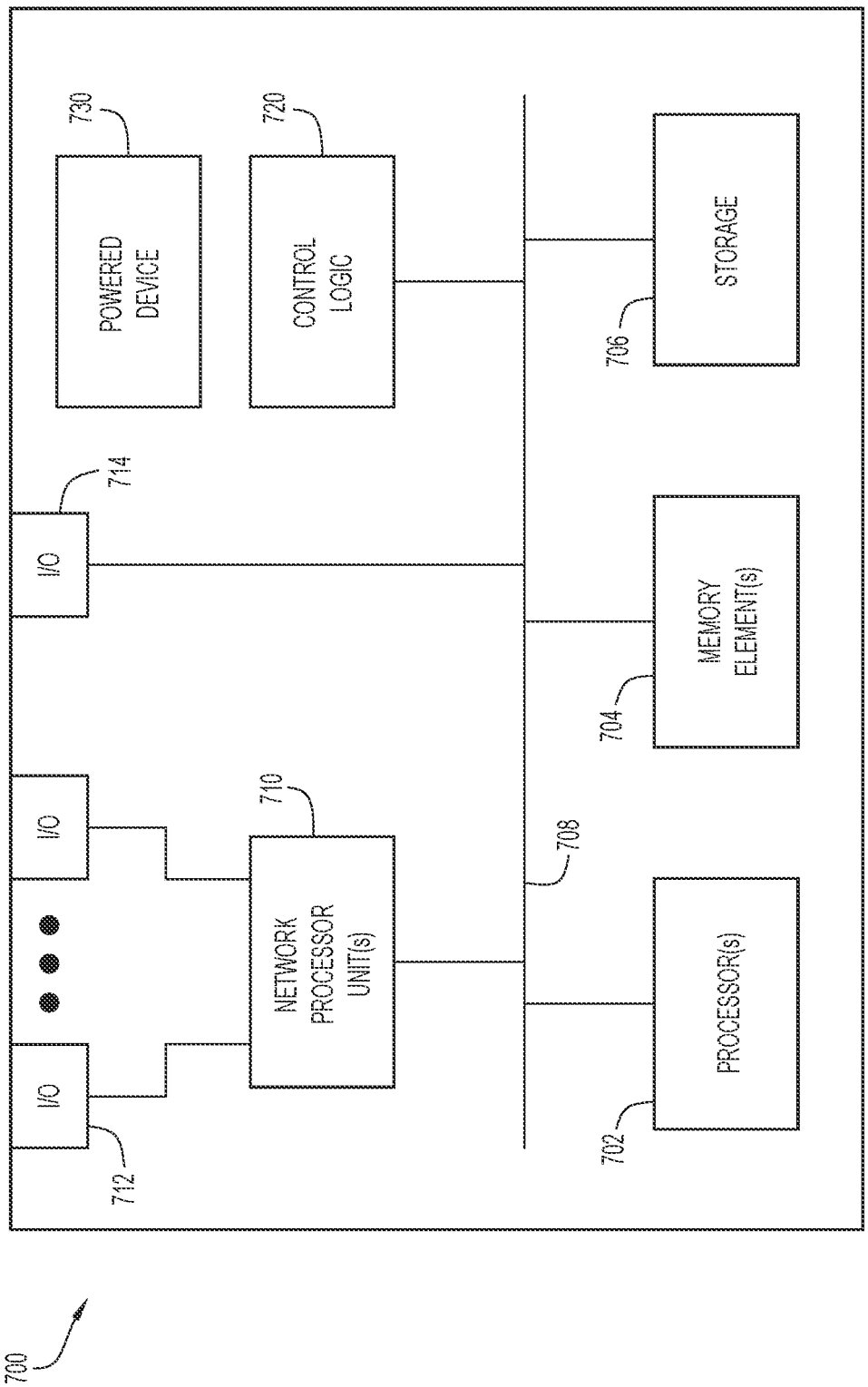
FIG. 7 illustrates a hardware block diagram of a device that may perform functions associated with operations discussed herein in connection with the techniques depicted in FIGS. 1-6.

Referring to FIG. 7, FIG. 7 illustrates a hardware block diagram of a device 700 that may perform functions associated with operations discussed herein in connection with the techniques depicted in FIGS. 1-6. In various embodiments, the device 700 may be a networking device, a computing device, or any electronic device that is to receive power according to the techniques presented herein.

In at least one embodiment, the device 700 may be any apparatus that may include one or more processor(s) 702, one or more memory element(s) 704, storage 706, a bus 708, one or more network processor unit(s) 710 interconnected with one or more network input/output (I/O) interface(s) 712, one or more I/O interface(s) 714, and control logic 720. In addition, the device 700 may include or integrate a powered device 730 that employs the components and functions of the PD 140 described above in connection with FIGS. 1-6. In various embodiments, instructions associated with logic for device 700 can overlap in any manner and are not limited to the specific allocation of instructions and/or operations described herein.

In at least one embodiment, processor(s) 702 is/are at least one hardware processor configured to execute various tasks, operations and/or functions for device 700 as described herein according to software and/or instructions configured for device 700. Processor(s) 702 (e.g., a hardware processor) can execute any type of instructions associated with data to achieve the operations detailed herein. In one example, processor(s) 702 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 704 and/or storage 706 is/are configured to store data, information, software, and/or instructions associated with device 700, and/or logic configured for memory element(s) 704 and/or storage 706. For example, any logic described herein (e.g., control logic 720) can, in various embodiments, be stored for device 700 using any combination of memory element(s) 704 and/or storage 706. Note that in some embodiments, storage 706 can be consolidated with memory element(s) 704 (or vice versa), or can overlap/exist in any other suitable manner.

In at least one embodiment, bus 708 can be configured as an interface that enables one or more elements of device 700 to communicate in order to exchange information and/or data. Bus 708 can be implemented with any architecture designed for passing control, data and/or information between processors, memory elements/storage, peripheral devices, and/or any other hardware and/or software components that may be configured for device 700. In at least one embodiment, bus 708 may be implemented as a fast kernel-hosted interconnect, potentially using shared memory between processes (e.g., logic), which can enable efficient communication paths between the processes.

In various embodiments, network processor unit(s) 710 may enable communication between device 700 and other systems, entities, etc., via network I/O interface(s) 712

(wired and/or wireless) to facilitate operations discussed for various embodiments described herein. In various embodiments, network processor unit(s) 710 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between device 700 and other systems, entities, etc. to facilitate operations for various embodiments described herein. In various embodiments, network I/O interface(s) 712 can be configured as one or more Ethernet port(s), Fibre Channel ports, any other I/O port(s), and/or antenna(s)/antenna array(s) now known or hereafter developed. Thus, the network processor unit(s) 710 and/or network I/O interface(s) 712 may include suitable interfaces for receiving, transmitting, and/or otherwise communicating data and/or information in a network environment.

I/O interface(s) 714 allow for input and output of data and/or information with other entities that may be connected to device 700. For example, I/O interface(s) 714 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 720 can include instructions that, when executed, cause processor(s) 702 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 720) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 704 and/or storage 706 can store data, software, code, instructions (e.g., processor instructions), logic, parameters, combinations thereof, and/or the like used for operations described herein. This includes memory element(s) 704 and/or storage 706 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Referring to FIG. 8, FIG. 8 illustrates a timing diagram 800 of waveforms in a single-phase example of the pulse power system shown in FIG. 1. The PSE HV pulse On/Off times are shown at reference numerals 810 and 820, respectively, in conjunction with the cable voltage waveform droops 830 during the HV-Off times 820. FIG. 8 shows that at the PD load end of the cable, the sync pulses 840 occur at the end of the cable voltage waveform droops 830 to allow proper synchronization of the remote PD modulate switch. The sync pulses 840 create a timing of blanking pulses 850 necessary to blank or mask pulse noise created after the PD modulator(s) start(s) switching, after an optional delay time. The sync pulses 840 also create a PD switch control pulse 860 to the output load for pulse power in synchronization with the HV-On times 810, after an optional delay time.

Referring to FIG. 9, FIG. 9 illustrates a timing diagram 900 of a two-phase (2-phase) example of a pulse power system shown in FIG. 1. PSE HV pulse voltage waveform timing is shown for a 2-phase system having a first PSE HV pulse waveform 910A and a second PSE HV pulse waveform 910B that is 180 degrees out of phase from HV pulse waveform 910A, each waveform 910A and 910B having a duty cycle of about 67%. PD load pulse timing waveforms for the 2-phases are shown at reference numerals 920A and 920B, and are synchronized to the PSE HV pulse waveforms 910A and 910B, respectively, with an optional delay turning-on and optional early turn-off timing for possible transient noise settling time of the droop voltage safety sensing circuits. Blanking pulse waveforms are shown at 930A and 930B for the two phases to blank the unwanted transients and thus avoid synchronizing to the wrong pulse and then become out of phase with the PSE modulator switch. Switching noise timing waveforms are shown at 940A and 940B for the two phases as unwanted transient voltages that need to be blanked or hidden from the synchronization circuits. Waveform 950 is the load current for the 2-phase example of FIG. 9.

During the Off-time intervals (denoted HV-Off) of the PSE waveform(s) in FIGS. 8 and 9, fault managed power techniques may be performed to detect perform safety/fault tests on the cable(s) of the pulse power. If a fault is detected, power to the cable(s) may be shut down.

The techniques presented herein are applicable to pulse power, as well as voltage pulses or data bits transmitted to a remote end point switching device(s) that may need to be synchronized for any reason such as a delay, adding multiple pulses or bits of data multiplexed to multiple end points with skewed delays, pulse isolation during the Off-time intervals between the DC source and output end point, or for other reasons such as grounding, or other applications now known or hereinafter developed.

In some aspects, the techniques described herein relate to a method to remotely control a switch device at a remote receiving end of an electrical circuit in synchronization with a pulse power switch device at a source end of the electrical circuit, the method including: detecting a pulse power waveform at the remote receiving end of the electrical circuit; detecting desired synchronization transients in the pulse power waveform for synchronizing operation of the switch device at the remote receiving end; and applying synchronization pulses, derived from the desired synchronization transients, at the remote receiving end of the electrical circuit to control operation of the switch device at the remote receiving end.

In some aspects, the techniques described herein relate to a method, wherein the pulse power waveform is a DC voltage waveform or a current waveform.

In some aspects, the techniques described herein relate to a method, wherein the switch device at the remote receiving end is a DC pulse voltage switch device.

In some aspects, the techniques described herein relate to a method, further including: turning on a load current with the switch device at the remote receiving end, resulting in undesired noise and/or spurious pulses being added to the pulse power waveform.

In some aspects, the techniques described herein relate to a method, further including: applying blanking pulses having a duration to blank the undesired noise and/or spurious pulses in the pulse power waveform.

In some aspects, the techniques described herein relate to a method, wherein applying includes applying blanking pulses for the duration beginning a time interval after each desired synchronization transient in the pulse power waveform.

In some aspects, the techniques described herein relate to a method, wherein the blanking pulses have a fixed or adjustable width.

In some aspects, the techniques described herein relate to a method, further including delaying each blanking pulse after occurrence of a desired synchronization transient in the pulse power waveform.

In some aspects, the techniques described herein relate to a method, wherein the pulse power waveform is transported via a power cable.

In some aspects, the techniques described herein relate to a method, wherein the pulse power waveform includes alternating on-time intervals and off-time intervals, and further including: monitoring voltage and/or current in the electrical circuit during the off-time intervals to detect a fault condition.

In some aspects, the techniques described herein relate to a method, wherein the pulse power waveform is associated with one phase of a plurality of phases, each phase for a pulse power waveform of a plurality of pulse power waveforms provided by the source end to a plurality of remote receiving ends each having a switch device.

In some aspects, the techniques described herein relate to a method, wherein detecting the pulse power waveform, detecting the desired synchronization transients and applying are performed with respect to a corresponding pulse power waveform of the plurality of pulse power waveforms.

In some aspects, the techniques described herein relate to a method, wherein the synchronization pulses have a fixed or adjustable width.

In some aspects, the techniques described herein relate to a method, further including delaying the synchronization pulses after occurrence of the desired synchronization transients.

In some aspects, the techniques described herein relate to an apparatus including: a switch device configured to receive a pulse power waveform provided by a source device over an electrical circuit and to provide pulse power output to a load; and a pulse detection circuit coupled to receive the pulse power waveform to detect desired synchronization transients in the pulse power waveform and to generate synchronization pulses to be applied to the switch device, derived from the desired synchronization transients, for synchronizing operation of the switch device.

In some aspects, the pulse detection circuit includes: a differential amplifier configured to detect positive transients in the pulse power waveform in the electrical circuit.

In some aspects, the apparatus further includes a differentiator and threshold comparator coupled to an output of the differential amplifier and is configured to output the synchronization pulses when a level of a differentiated voltage derived from an output of the differential amplifier exceeds a threshold.

In some aspects, the switch device is configured to turn on and supply load current to the load, resulting in undesired noise and/or spurious pulses being added to the pulse power waveform.

In some aspects, the apparatus further includes a blanking pulse generator circuit configured to generate a blanking pulse to be applied to the pulse detection circuit to blank, for a duration, the undesired noise and/or spurious pulses being added to the pulse power waveform.

In some aspects, the blanking pulse generator circuit applies the blanking pulse for the duration beginning a time interval after each desired synchronization transient in the pulse power waveform, and wherein the blanking pulse has a fixed or adjustable width.

In some aspects, the apparatus further includes a delay circuit configured to delay each blanking pulse after occurrence of a desired synchronization transient in the pulse power waveform.

In some aspects, the synchronization pulses have a fixed or adjustable width.

In some aspects, the apparatus further includes a delay circuit configured to delay the synchronization pulses after occurrence of the desired synchronization transients.

In some aspects, the techniques described herein relate to a system including: a power source device that includes a pulse power switch device configured to generate a pulse power waveform; and a power receiver device coupled to receive the pulse power waveform via an electrical circuit, wherein the power receiver device includes: a switch device configured to receive the pulse power waveform and to provide pulse power output to a load; and a pulse detection circuit coupled to receive the pulse power waveform to detect desired synchronization transients in the pulse power waveform and to generate synchronization pulses to be applied to the switch device, derived from the desired synchronization transients, for synchronizing operation of the switch device.

In some aspects, the pulse detection circuit includes a differential amplifier configured to detect positive transients in the pulse power waveform in the electrical circuit.

In some aspects, the pulse detection circuit further includes a differentiator and threshold comparator coupled to an output of the differential amplifier and is configured to output the synchronization pulses when a level of a differentiated voltage derived from an output of the differential amplifier exceeds a threshold.

In some aspects, the switch device is configured to turn on and supply load current to the load, resulting in undesired noise and/or spurious pulses being added to the pulse power waveform.

In some aspects, the power receiver device further includes: a blanking pulse generator circuit configured to generate a blanking pulse to be applied to the pulse detection circuit to blank, for a duration, the undesired noise and/or spurious pulses being added to the pulse power waveform.

In some aspects, the techniques described herein relate to a system including: a DC voltage source device that includes a voltage switch device configured to generate a DC pulse voltage waveform; and a receiver device coupled to receive the pulse voltage waveform via an electrical circuit, wherein the receiver device includes: a switch device configured to receive the pulse voltage waveform and to provide a pulse voltage output to a load circuit; and a voltage or current pulse detection circuit coupled to receive the pulse voltage waveform to detect desired synchronization voltage or current transients in the pulse voltage waveform and to generate synchronization pulses to be applied to the switch device, derived from the desired synchronization voltage or current transients, for synchronizing operation of the switch device.

In some aspects, the voltage or current pulse detection circuit includes a differential amplifier configured to detect positive transients in the pulse voltage waveform in the electrical circuit.

In some aspects, the voltage or current pulse detection circuit further includes a differentiator and threshold comparator coupled to an output of the differential amplifier and is configured to output the synchronization pulses when a level of a differentiated voltage derived from an output of the differential amplifier exceeds a threshold.

In some aspects, the switch device is configured to turn on and supply load current to the load circuit, resulting in undesired noise and/or spurious pulses being added to the pulse voltage waveform.

In some aspects, the receiver device further includes a blanking pulse generator circuit configured to generate a blanking pulse to be applied to the voltage or current pulse detection circuit to blank, for a duration, the undesired noise and/or spurious pulses being added to the pulse voltage waveform.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method to remotely control a switch device at a remote receiving end of an electrical circuit in synchronization with a pulse power switch device at a source end of the electrical circuit, the method comprising:
   detecting a pulse power waveform at the remote receiving end of the electrical circuit, the pulse power waveform including alternating on-time intervals and off-time intervals;
   detecting synchronization transients in the pulse power waveform for synchronizing operation of the switch device at the remote receiving end, the synchronization transients comprising positive going transitions having a voltage change rate greater than a threshold in the pulse power waveform that create a switch control pulse to turn on a load current with the switch device at the remote receiving end in synchronization with the on-time intervals of the pulse power waveform, resulting in noise and/or spurious pulses being added to the pulse power waveform;
   applying blanking pulses at the remote receiving end of the electrical circuit, wherein the blanking pulses having a timing created by the synchronization transients and a duration to blank the noise and/or spurious pulses in the pulse power waveform; and
   applying synchronization pulses, derived from the synchronization transients, at the remote receiving end of the electrical circuit to control operation of the switch device at the remote receiving end.

2. The method of claim 1, wherein the pulse power waveform is a DC voltage waveform or a current waveform.

3. The method of claim 2, wherein the switch device at the remote receiving end is a DC pulse voltage switch device.

4. The method of claim 1, wherein applying comprises applying blanking pulses for the duration beginning a time interval after each synchronization transient in the pulse power waveform.

5. The method of claim 4, wherein the blanking pulses have a fixed or adjustable width.

6. The method of claim 1, further comprising delaying each blanking pulse after occurrence of a synchronization transient in the pulse power waveform.

7. The method of claim 1, wherein the pulse power waveform is transported via a power cable.

8. The method of claim 1, further comprising:
   monitoring voltage and/or current in the electrical circuit during the off-time intervals to detect a fault condition.

9. The method of claim 1, wherein the pulse power waveform is associated with one phase of a plurality of phases, each phase for a pulse power waveform of a plurality of pulse power waveforms provided by the source end to a plurality of remote receiving ends each having a switch device.

10. The method of claim 9, wherein detecting the pulse power waveform, detecting the synchronization transients and applying are performed with respect to a corresponding pulse power waveform of the plurality of pulse power waveforms, wherein applying comprises applying a respective blanking pulse waveform of a plurality of blanking pulse waveforms, each respective blanking pulse waveform having blanking pulses with a timing with respect to synchronization transients of the corresponding pulse power waveform.

11. The method of claim 1, wherein the synchronization pulses have a fixed or adjustable width.

12. The method of claim 11, further comprising delaying the synchronization pulses after occurrence of the synchronization transients.

13. An apparatus comprising:
   a switch device configured to receive a pulse power waveform provided by a source device over an electrical circuit and to provide pulse power output to a load at a remote receiving end, the pulse power waveform including alternating on-time intervals and off-time intervals;
   a pulse detection circuit coupled to receive the pulse power waveform to detect synchronization transients in the pulse power waveform, the synchronization transients comprising positive going transients having a voltage change rate greater than a threshold in the pulse power waveform that create a switch control pulse to turn on a load current with the switch device at the remote receiving end in synchronization with the on-time intervals of the pulse power waveform, resulting in noise and/or spurious pulses being added to the pulse power waveform, and to generate synchronization pulses to be applied to the switch device, derived from the synchronization transients, for synchronizing operation of the switch device; and a blanking pulse generator circuit configured to generate blanking pulses to be applied to the pulse detection circuit to blank, for a duration, noise and/or spurious pulses being added to the pulse power waveform, wherein the blanking pulses have a timing created by the synchronization transients.

14. The apparatus of claim 13, wherein the pulse detection circuit comprises:
a differential amplifier configured to detect the positive going transients in the pulse power waveform in the electrical circuit.

15. The apparatus of claim 14, further comprising:
a differentiator and threshold comparator coupled to an output of the differential amplifier and configured to output the synchronization pulses when a level of a differentiated voltage derived from an output of the differential amplifier exceeds a threshold.

16. The apparatus of claim 13, wherein the blanking pulse generator circuit applies the blanking pulses for the duration beginning a time interval after each synchronization transient in the pulse power waveform, and wherein each blanking pulse has a fixed or adjustable width.

17. The apparatus of claim 16, further comprising a delay circuit configured to delay each blanking pulse after occurrence of a synchronization transient in the pulse power waveform.

18. The apparatus of claim 13, wherein the synchronization pulses have a fixed or adjustable width.

19. The apparatus of claim 18, further comprising a delay circuit configured to delay the synchronization pulses after occurrence of the synchronization transients.

20. The apparatus of claim 13, wherein a plurality of pulse power waveforms, each pulse power waveform for a corresponding phase of a plurality of phases, are provided by to a plurality of remote receiving ends each having a switch device, wherein the pulse detection circuit is configured to detect the synchronization transients with respect to a corresponding pulse power waveform of the plurality of pulse power waveforms, wherein the blanking pulse generator circuit is configured to apply a respective blanking pulse waveform of a plurality of blanking pulse waveforms, each respective blanking pulse waveform having blanking pulses with a timing with respect to synchronization transients of the corresponding pulse power waveform.

21. A system comprising:
a power source device that includes a pulse power switch device configured to generate a pulse power waveform, the pulse power waveform including alternating on-time intervals and off-time intervals; and
a power receiver device coupled to receive the pulse power waveform via an electrical circuit, wherein the power receiver device comprises:
a switch device configured to receive the pulse power waveform and to provide pulse power output to a load;
a pulse detection circuit coupled to receive the pulse power waveform to detect synchronization transients in the pulse power waveform, the synchronization transients comprising positive going transients having a voltage change rate greater than a threshold in the pulse power waveform that create a switch control pulse to turn on a load current with the switch device at the power receiver device in synchronization with the on-time intervals of the pulse power waveform, resulting in noise and/or spurious pulses being added to the pulse power waveform, and to generate synchronization pulses to be applied to the switch device, derived from the synchronization transients, for synchronizing operation of the switch device; and a blanking pulse generator circuit configured to generate blanking pulses to be applied to the pulse detection circuit to blank, for a duration, noise and/or spurious pulses being added to the pulse power waveform, wherein the blanking pulses have a timing created by the synchronization transients.

22. The system of claim 21, wherein the pulse detection circuit comprises:
a differential amplifier configured to detect the positive going transients in the pulse power waveform in the electrical circuit.

23. The system of claim 22, wherein the pulse detection circuit further comprises:
a differentiator and threshold comparator coupled to an output of the differential amplifier and is configured to output the synchronization pulses when a level of a differentiated voltage derived from an output of the differential amplifier exceeds a threshold.

24. The system of claim 21, wherein the power source device is configured to generate a plurality of pulse power waveforms each of which is associated with a phase of a plurality of phases, to be provided by to a plurality of remote receiving ends each having a switch device, wherein the pulse detection circuit is configured to detect the synchronization transients with respect to a corresponding pulse power waveform of the plurality of pulse power waveforms, wherein the blanking pulse generator circuit is configured to apply a respective blanking pulse waveform of a plurality of blanking pulse waveforms, each respective blanking pulse waveform having blanking pulses with a timing with respect to synchronization transients of the corresponding pulse power waveform.

25. A system comprising:
a direct current (DC) voltage source device that includes a switch device configured to generate a DC pulse power waveform, the DC pulse power waveform including alternating on-time intervals and off-time intervals; and
a receiver device coupled to receive the DC pulse power waveform via an electrical circuit, wherein the receiver device comprises:
a switch device configured to receive the DC pulse power waveform and to provide a pulse output to a load circuit;
a pulse detection circuit coupled to receive the DC pulse power waveform to detect synchronization voltage or current transients in the DC pulse power waveform, the synchronization voltage or current transients comprising positive going transients having a voltage or current change rate greater than a threshold in the DC pulse power waveform that create a switch control pulse to turn on a load current with the switch device at the receiver device in synchronization with the on-time intervals of the DC pulse power waveform, resulting in noise and/or spurious pulses being added to the DC pulse power waveform, and to generate synchronization pulses to be applied to the switch device, derived from the synchronization voltage or current transients, for synchronizing operation of the switch device; and a blanking pulse generator circuit configured to generate blanking pulses to be applied to the pulse detection circuit to blank, for a duration, noise and/or spurious pulses being added to the DC pulse power waveform, wherein the blanking pulses have a timing created by the synchronization voltage or current transients.

26. The system of claim 25, wherein the pulse detection circuit comprises:

a differential amplifier configured to detect the positive going transients in the DC pulse power waveform in the electrical circuit.

27. The system of claim 26, wherein the pulse detection circuit further comprises:

a differentiator and threshold comparator coupled to an output of the differential amplifier and is configured to output the synchronization pulses when a level of a differentiated voltage derived from an output of the differential amplifier exceeds a threshold.

28. The system of claim 21, wherein the blanking pulse generator circuit applies the blanking pulses for the duration beginning a time interval after each synchronization transient in the pulse power waveform, and wherein each blanking pulse has a fixed or adjustable width.

29. The system of claim 28, further comprising a delay circuit configured to delay each blanking pulse after occurrence of a synchronization transient in the pulse power waveform.

30. The system of claim 25, wherein the blanking pulse generator circuit applies the blanking pulses for the duration beginning a time interval after each synchronization transient in the DC pulse power waveform, and wherein each blanking pulse has a fixed or adjustable width.

31. The system of claim 30, further comprising a delay circuit configured to delay each blanking pulse after occurrence of a synchronization transient in the DC pulse power waveform.

32. The system of claim 25, wherein the DC voltage source device is configured to generate a plurality of DC pulse power waveforms each of which is associated with a phase of a plurality of phases, to be provided by to a plurality of remote receiving ends each having a switch device, wherein the pulse detection circuit is configured to detect the synchronization voltage or current transients with respect to a corresponding DC pulse power waveform of the plurality of DC pulse power waveforms, wherein the blanking pulse generator circuit is configured to apply a respective blanking pulse waveform of a plurality of blanking pulse waveforms, each respective blanking pulse waveform having blanking pulses with a timing with respect to synchronization transients of the corresponding DC pulse power waveform.

* * * * *